United States Patent
Graves et al.

(10) Patent No.: US 6,819,996 B2
(45) Date of Patent: Nov. 16, 2004

(54) CONTROL SYSTEM FOR OPERATING A VEHICLE WITHIN A LIMITED ENGINE SPEED RANGE

(75) Inventors: Jeffrey D. Graves, Lacon, IL (US); Russell T. Fahlberg, Dunlap, IL (US); Jeffrey Allen Lee Smith, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/334,050

(22) Filed: Dec. 30, 2002

(65) Prior Publication Data

US 2004/0128047 A1 Jul. 1, 2004

(51) Int. Cl.$^7$ .............................. G06F 17/00; G06F 7/00
(52) U.S. Cl. ........................... 701/54; 701/93; 180/170; 477/34; 123/352; 475/118
(58) Field of Search ............................. 701/54, 51, 93, 701/96, 56, 55; 477/34, 115, 110, 107, 111, 43, 80, 91, 186, 187; 180/170, 179, 176; 123/352; 475/118

(56) References Cited

U.S. PATENT DOCUMENTS

| | | |
|---|---|---|
| 5,830,104 A | 11/1998 | Desautels et al. |
| 6,027,425 A | 2/2000 | Sakaguchi et al. |
| 6,077,187 A | 6/2000 | Suzuki et al. |
| 6,104,976 A | 8/2000 | Nakamura |
| 6,133,643 A | 10/2000 | Lukich et al. |
| 6,151,978 A | 11/2000 | Huber |
| 6,167,979 B1 | 1/2001 | Taylor et al. |
| 6,169,950 B1 | 1/2001 | Parigger |
| 6,181,020 B1 | 1/2001 | Uchida et al. |
| 6,199,004 B1 | 3/2001 | Russell et al. |
| 6,249,733 B1 | 6/2001 | Smith |
| 6,260,647 B1 | 7/2001 | Calamari et al. |
| 2002/0010534 A1 | 1/2002 | Goodnight et al. |

Primary Examiner—Thomas G. Black
Assistant Examiner—Olga Hernandez
(74) Attorney, Agent, or Firm—Liell & McNeil

(57) ABSTRACT

Although there are various combinations of engine speed and transmission state that correspond to a selected vehicle speed and load, there is one combination that best achieves a predetermined criteria. The present invention relates to a vehicle including a control system that electronically controls engine speed and transmission state in order to best achieve the predetermined criteria, such as fuel economy. There is an electronic control module including a power train algorithm that is in control communication with the transmission and the engine. The predetermined criteria is achieved by establishing a limited engine speed range that is less than an entire engine speed range, and restricting engine speed, via the power train algorithm, to the limited engine speed range. The power train algorithm is also operable to determine a combination of the engine speed, within the limited engine speed range, and transmission state that corresponds to a selected vehicle speed and the predetermined criteria.

20 Claims, 3 Drawing Sheets

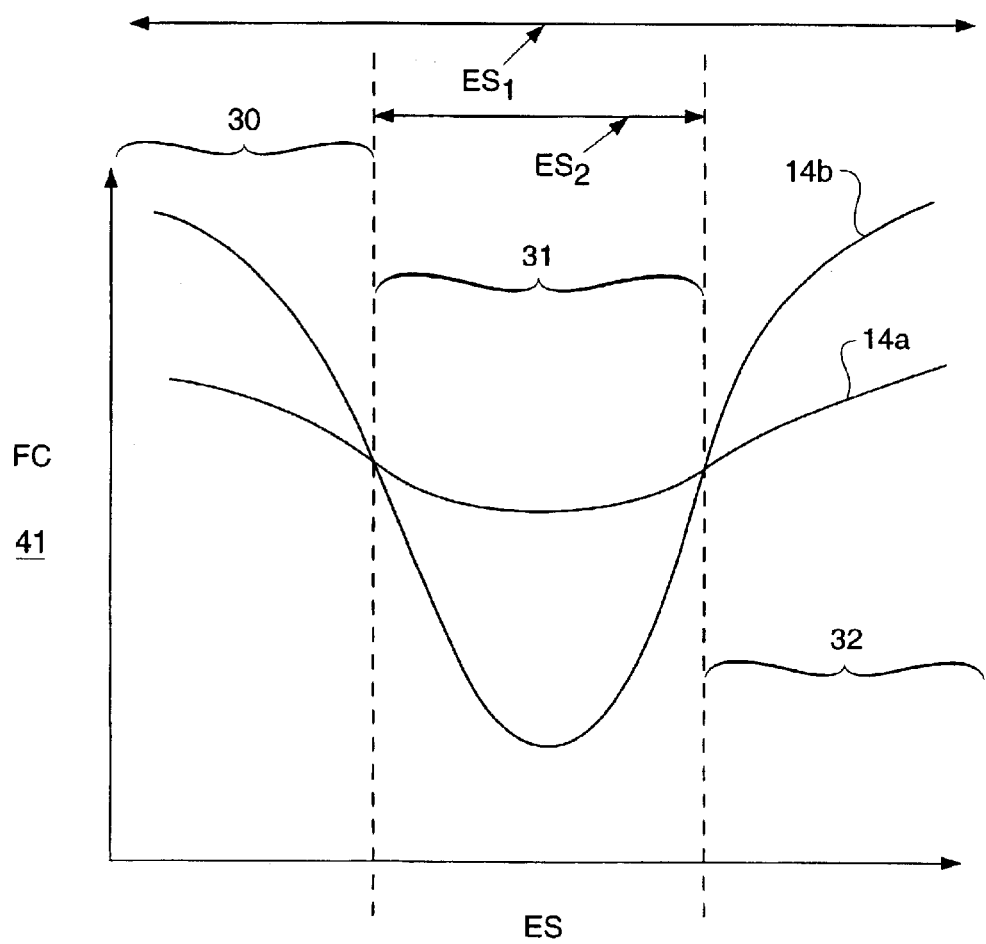

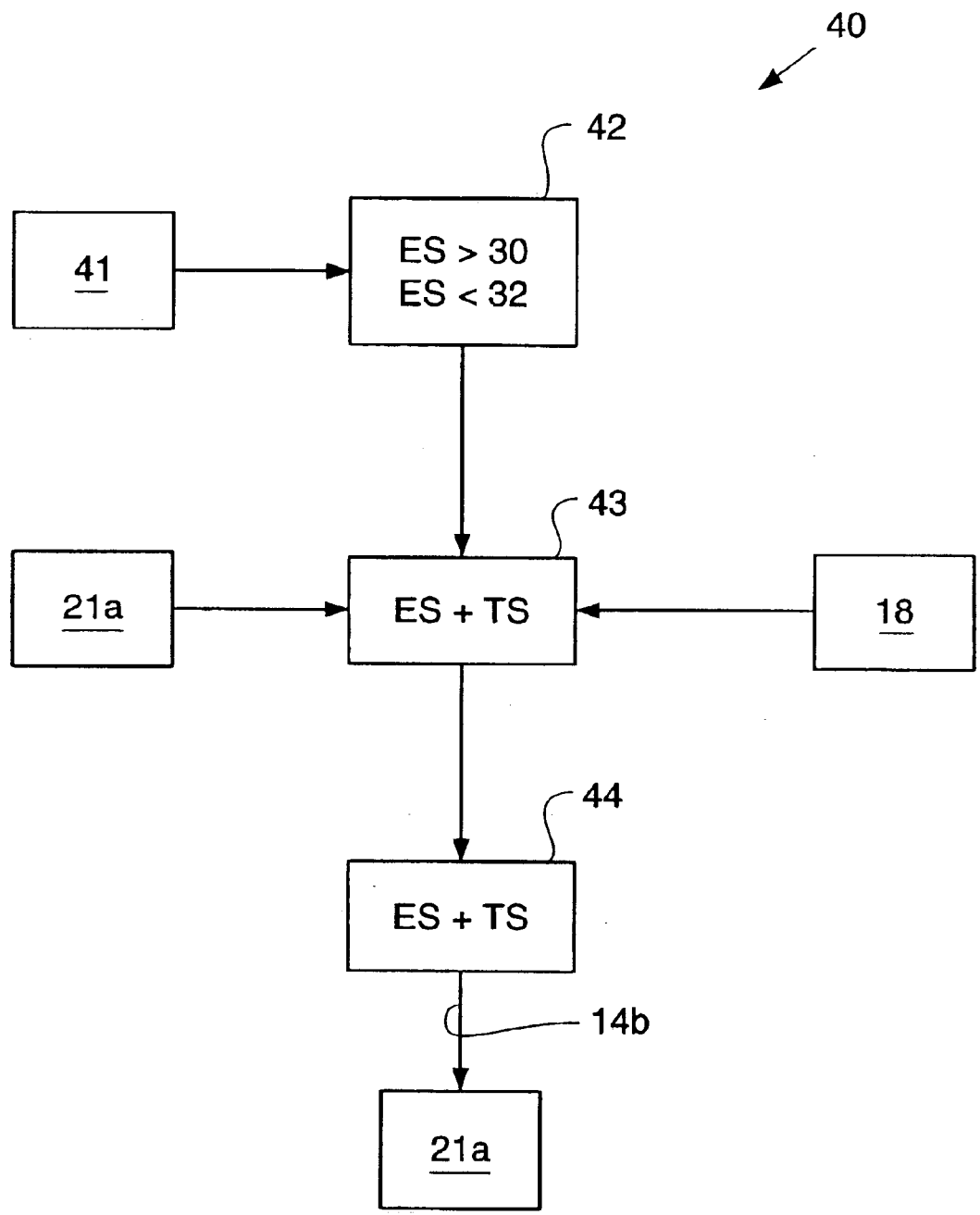

CONTROL SYSTEM FOR OPERATING A VEHICLE WITHIN A LIMITED ENGINE SPEED RANGE

TECHNICAL FIELD

The present invention relates generally to vehicles powered by internal combustion engines, and more specifically to a control system for operating a vehicle within a limited engine speed range.

BACKGROUND

It is well known in the art that there is an engine speed at which an engine most efficiently operates based upon one or more criteria. This criteria often includes some weighted combination of fuel economy, reduced emissions and vehicular performance. Engineers are constantly seeking strategies for determining and operating the engine at its "optimal" engine speed. One such strategy is engine mapping. Those skilled in the art appreciate that engine mapping is a process of determining the quantity and timing of fuel injections in order to achieve the desired engine speed and satisfy a predetermined criteria. The predetermined criteria are generally aspects of vehicular operation, including but not limited to, fuel economy, vehicular performance, and undesirable emissions reduction.

Typically, the engine map includes the entire range of engine speeds over which the engine is expected to operate. The entire range of engine speeds is based on the vehicle's duty cycle, or expected range of operation. For instance, for an over the road truck expected to travel within a certain range of speeds and haul a certain range of loads, the entire engine speed range is the range of engine speeds required to power the truck while traveling at any speed and hauling any load within the expected ranges. By mapping the entire engine speed range, the range of engine speeds in which the predetermined criteria is "optimized" can be determined. However, in order to "optimize" the predetermined criteria over the entire engine speed range, compromises must be made. For instance, in order to achieve a slight reduction of undesirable emissions at a higher engine speed, the possible reduction of emissions at a lower engine speed, fuel economy and/or vehicular performance may be compromised.

It is also well known in the art that vehicle speed is, at least in part, a function of transmission state and engine speed. Thus, a relatively constant engine speed can be maintained, despite a varying vehicle speed, by adjusting a transmission state or gear. For instance, there are control systems, such as that shown in U.S. Pat. No. 6,260,647 issued to Calamari et al., on Jul. 17, 2001, in which the vehicle speed is controlled independent of the engine speed by adjusting the transmission. Thus, the engine speed can be maintained to power a work machine implement, while the transmission state can be adjusted to control the changing work machine speed. Although the Calamari control system maintains the engine speed by adjusting the transmission state, the Calamari control system is designed to maintain engine speed to power work machine implements, rather than to maximize the efficiency and/or performance of over the road vehicles. The control system is not designed to maintain engine speed at or near the engine's preferred speed range. Further, although the Calamari control system electronically sets the engine speed, the control system does not electronically determine and set the transmission state.

Lastly, it is also know in that art that, although there are various A combinations of transmission state and engine speed corresponding with a selected vehicle speed and load, there is a combination that corresponds with the selected vehicle speed and load while optimizing fuel economy. Over the years, engineers, based on experience and observation, have realized that a knowledgeable operator can operate the vehicle at the ideal combination of transmission state and engine speed for the selected vehicle speed and fuel economy. In other words, the knowledgeable operator can operate the vehicle while consuming the least amount of fuel for the selected vehicle speed. However, an operator who lacks the appropriate knowledge may operate the identical vehicle at the identical selected vehicle speed as the knowledgeable operator, but use a different combination of transmission state and engine speed. Although both operators are operating the vehicle under identical conditions, i.e., speed and load, the vehicle, when operated by the knowledgeable operator, will consume less fuel than the vehicle, when operated by the unknowledgeable operator.

SUMMARY OF THE INVENTION

In one aspect of the present invention, there is a method of operating a vehicle. A limited engine speed range that is less than an entire engine speed range is established, and a vehicle speed is selected. An electronic control module includes a power train algorithm that determines, at least in part, a combination if an engine speed and a transmission state based, at least in part, on the selected vehicle speed and a predetermined criteria. The engine speed is within the limited engine speed range.

BRIEF DESCRIPTION OF THE DRAWINGS

FIG. 2 is a graph illustrating a predetermined criterion, shown in terms of fuel consumption, versus engine speed, for an engine included in the vehicle of FIG. 1; and FIG. 3 is a flow chart of a power-train algorithm included within the control system of FIG. 1, according to one embodiment of the present invention.

DETAILED DESCRIPTION

Figure 1:
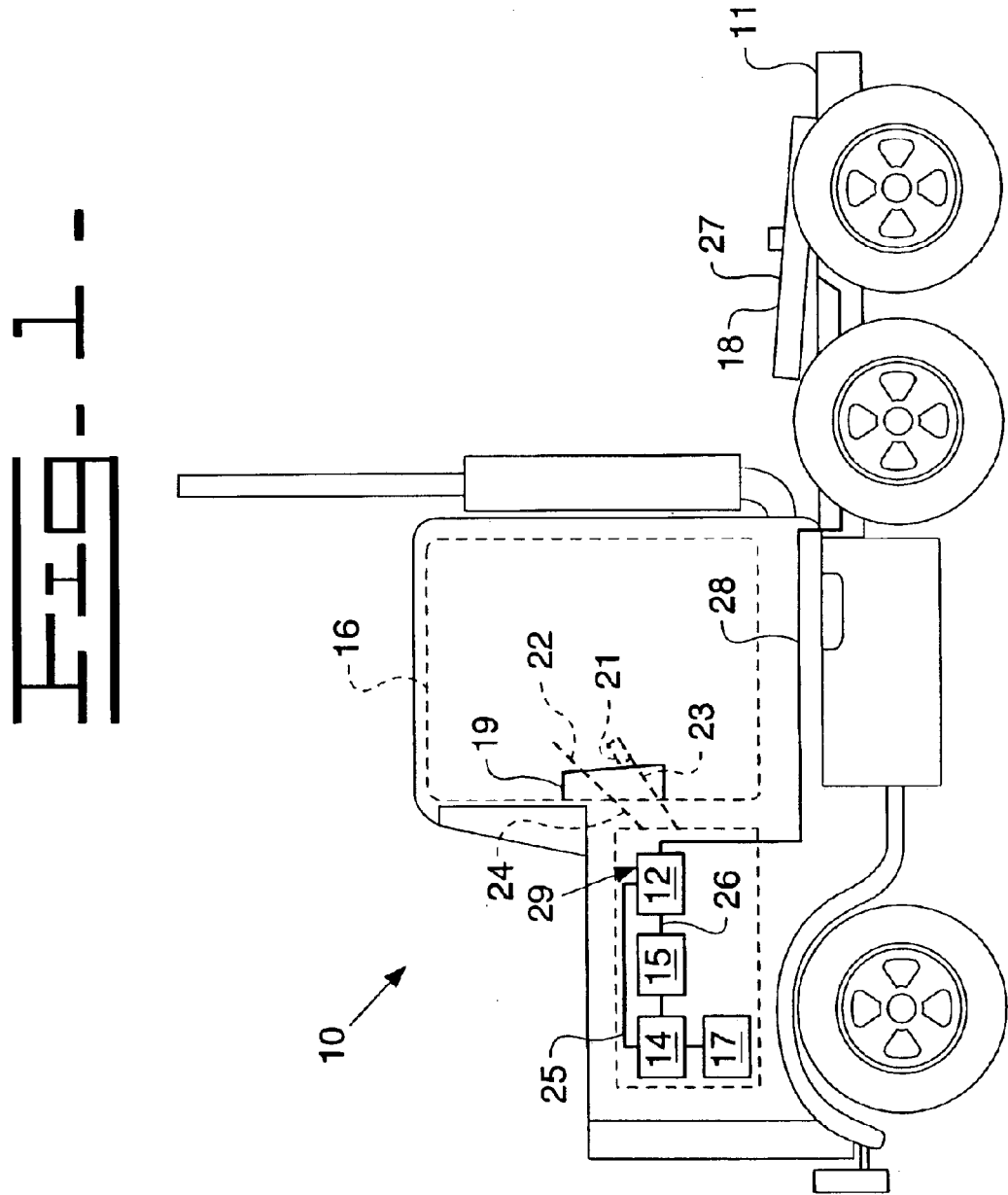
FIG. 1 is a side view of a vehicle including a control system, according to one embodiment of the present invention.

Referring to FIG. 1, there is shown a vehicle 10 including a control system 29, according to one embodiment of the present invention. Although the vehicle 10 is shown as an over-the-road truck, the present invention contemplates any type or size of vehicle having an electronically controlled transmission, including but not limited to, off road work machines. The vehicle 10 includes a chassis 11 to which an engine 14 and a transmission 15 are mounted. The transmission 15 is operably coupled to the engine 14 in a conventional manner. It should be appreciated that the transmission 15 could include discrete gears or continuously variable states. The control system 29 controls engine speed and transmission state and preferably includes an electronic control module 12. The vehicle 10 may include a cab 16 and a trailer hitch 18, at which a load, such as a trailer, can be attached for transportation. A load sensor 27 may be operably coupled to the trailer hitch 18 and is in communication with an electronic control module 12 via a sensor communication line 28. Those skilled in the art will appreciate that the load sensor 27 could be positioned at various points within the chassis 11 and could be of various types. Alternatively, engine load could be determined via the electronic data broadcast from the electronic control module. A load percent and/or an estimate of torque at the flywheel can be broadcast over the data link. This information is often used by auto-shift transmissions, anti-lock braking systems, traction control systems, and the like. Thus, those skilled in the art will appreciate that, in addition to load sensors, there are various known methods of determining a load on an engine.

A vehicle speed setting operator interface 19 is supported by the chassis 11 and is located in the cab 16 within the operator's reach. The vehicle speed control interface 19 typically includes, at least, a vehicle speed controller, illustrated as a foot pedal 21, and a transmission controller 22, illustrated as a hand operated gear shifter. The foot pedal 21 and the transmission controller 22 are operably coupled to the electronic control module 12, and are in control communication with the engine 14 and the transmission 15, respectively. The foot pedal 21 is typically in communication with the electronic control module 12 via the pedal communication line 23, and the electronic control module 12 is preferably in communication with the engine 14 via an engine communication line 25. The transmission controller 22 is typically in communication with the electronic control module 12 via the transmission controller communication line 24, and the electronic control module 24 is preferably in communication with the transmission 15 via the transmission communication line 26. Typically, an auxiliary system 17, such as a hydraulic system or cooling system, will be operably coupled to and powered by the engine 14.

Referring to FIG. 2, there is shown a graph illustrating a predetermined criterion 41, shown in terms of fuel consumption (FC), versus engine speed (ES) of the engine 14 included in the vehicle 10 of FIG. 1, according to the present invention. The fuel consumption (FC) versus the engine speed (ES) is illustrated for the engine 14 when including a conventional engine map 14a and for the engine 14 when including an engine re-map 14b that improves fuel consumption over a limited engine speed range ($ES_2$). Those skilled in the art should appreciate that a map is a multi-dimensional table of quantity and timing of control signals versus desired injection quantity, desired timing and other known variables, such as desired engine speed, etc. It should further be appreciated that there are other data analysis processes, such as control algorithms, that can be used to determine the required control signals in order to achieve the engine speed (ES) for the predetermined criteria 41. Although the predetermined criteria 41 can include any effect of engine operation, the predetermined criteria 41 typically includes at least one of fuel economy, vehicle performance, and undesirable emissions reduction. It should further be appreciated that although the predetermined criterion is illustrated as fuel economy, and shown as fuel consumption (FC), the engine 14 could be mapped for any weighted combination of the increased fuel economy, increased vehicle performance, and reduced undesirable emissions.

A limited engine speed range ($ES_2$) is a range of engine speed which is less than an entire engine speed range ($ES_1$). The limited engine speed range ($ES_2$) is typically a middle range of engine speeds in which the engine 14 operates the most efficiently based on the predetermined criteria 41. The limited engine range ($ES_2$) is also typically the range of engine speeds in which the engine 14 should be most frequently operated. The present invention recognizes that knowledgeable operators operate the vehicle 10 mostly in the limited range of speeds while conserving fuel. The limited engine speed range ($ES_2$) is selected based on operating methods used by the knowledgeable operators. The limited engine speed range ($ES_2$) is the range of engine speed within which the knowledgeable operator operates the vehicle 10 in order to maintain a selected vehicle speed and meet the predetermined criterion 41 of fuel conservation.

Referring still to FIG. 2, it should be appreciated that once the limited engine speed range (ES2) is established, the engine re-map 14b can be created. The engine re-map 14b is a re-map of the timing and quantity of fuel injections to improve fuel consumption within the selected limited engine speed range ($ES_2$); whereas, the conventional engine map 14a is a map of the timing and quantity of fuel injections to improve fuel consumption over the entire engine speed range ($ES_2$). The engine re-map 14b includes lower fuel consumption (FC) within the limited engine speed range (ES2), but higher fuel consumption within an upper portion 32 and a lower portion 31 of the entire engine speed range (ES1) than the conventional engine map 14a shows. This is because, in part, both engine maps 14a and 14b are assumed to be emissions compliant. The engine re-map 14b preferably is included within the electronic control module 12 of the engine 14.

Referring to FIG. 3, there is shown a flow diagram of a power train algorithm 40 included within the control system 29 of the vehicle 10 of FIG. 1, according to one embodiment of the present invention. The control system 29 includes a power train algorithm 40 being recorded on a computer readable data storage medium, preferably within the electronic control module 14. The power train algorithm 40 includes a restricting step 42, in which the power train algorithm 40 is operable to restrict the engine speed (ES) to the limited engine speed range ($ES_2$), which is less than the entire engine speed range ($ES_1$). Thus, the power train algorithm 40 will restrict the engine speed (ES) from increasing to the upper portion 32 of the entire engine speed range ($ES_1$) and decreasing below the lower portion 31 of the entire engine speed range ($ES_1$) when the power train algorithm 40 is active. The power train algorithm 40 also includes a determining step 43 wherein the power train algorithm 40 is operable to determine a combination of the engine speed (ES), within the limited engine speed range ($ES_2$), and a transmission state (TS) that corresponds to a selected vehicle speed 21a and the predetermined criteria 41. The determining step 43 of the power trial algorithm 40 preferably includes a map of the engine speed (ES), within the limited engine speed range ($ES_2$), and the transmission state (TS) versus vehicle speed 21a and load 18a. The map is preferably based on the knowledgeable operator's selection of the combination of engine speed (ES) and transmission state (TS) in order to achieve the selected vehicle speed 21a and load 18a, as confirmed by modeling and observation. Although mapping is the preferred process for determining the combination of transmission state (TS) and engine speed (ES), any process of determining the desired combination in order to maintain the desired engine speed (ES) for the vehicle speed 21a and load 18a, such as using formulas, can be utilized. Preferably, the power train algorithm 40 includes a setting step 44 in which the combination of engine speed (ES) and transmission state (TS) is set based on the selected vehicle speed 21a and the predetermined criteria 41. The setting step 44 preferably includes the limited engine speed range map 14b. Those skilled in the art will appreciate that there are a few situations in which it would not be beneficial, or possibly feasible, to restrict the engine speed (ES) to the limited engine speed range ($ES_2$). For instance, such a situation may occur when the vehicle 10 is operating at low speed and/or loads, or when the vehicle is moving at a high rate of speed with a large load. Thus, when the electronic control module 12 senses that the demands on the engine 14 are so low or high that it is undesirable for the engine speed (ES) to be limited, the power train algorithm 40 will preferably remain inactive and the engine speed (ES) and transmission state (TS) will be set in a conventional manner, such as by the operator.

INDUSTRIAL APPLICABILITY

Referring to FIGS. 1–3, the operation of embodiments of the present invention will be discussed for the over the road truck 10, although the present invention contemplates application in any type or size of vehicle including an off road work machine having an electronically-controlled transmission. Further, it should be appreciated that although the application of the present invention will be discussed for the predetermined criterion of fuel economy, the present invention operates similarly for any one of the predetermined criteria, or a combination of the predetermined criteria 41. Although those skilled in the art will appreciate that vehicular performance can be defined in various ways, embodiments of the present invention contemplates vehicular performance as defined by engine torque. Further, those skilled in the art appreciate that fuel economy can be defined in various measurements, such as miles per gallon. Undesirable emissions include $NO_X$, particulates and unburned hydrocarbons Based on the predetermined criterion of fuel economy, engineers will establish the limited engine speed range ($ES_2$), which is less than the entire engine speed range ($ES_1$). The limited engine speed range ($ES_2$) will preferably include the middle portion 31 of the entire engine speed range ($ES_1$). The limited engine speed range ($ES_2$) is selected based on the knowledgeable operator's method of operating the vehicle 10. In order to limit fuel consumption (FC) while operating the vehicle 10, the knowledgeable operator will select the "optimal" combination of engine speed (ES) and transmission state (TS) required to achieve the selected vehicle speed 21a and load 18a. In order to operate the vehicle 10 at the selected vehicle speed 21a while consuming the least amount of fuel, the knowledgeable operator generally restricts the engine speed (ES) to within the limited range of engine speeds. The knowledgeable operator's limited range of engine speeds that reduces fuel consumption is established as the power train algorithms' 40 limited engine speed range ($ES_2$). Thus, the limited engine speed range ($ES_2$) is preferably the range of engine speeds at which fuel consumption (FC) is the lowest and the engine 14 most frequently operates.

Referring now to FIG. 1, the vehicle operator selects the vehicle speed 21a by depressing the foot pedal 21. The selected vehicle speed 21a is communicated to the electronic control module 12 via the pedal communication line 23. Further, the load sensor 27 senses the load 18a and communicates the load 18a to the electronic control module 12 via the load communication line 28. Alternatively, the electronic control module could calculate engine load internally, and broadcast this value as an output in a conventional manner. It should be appreciated that there are situations, such as when the vehicle 10 is operating at relatively low speeds and/or loads or when the vehicle 10 is moving at high rate of speed and load, limiting the engine speed (ES) to the limited engine speed range ($ES_2$) may not be desirable or feasible. Therefore, embodiments of present invention contemplates that the electronic control module 12 may determine the actual vehicle speed and load 18a prior to activating the power train algorithm 40. In situations where the vehicle speed and load 18a is such that it is not desirable to limit the engine speed (ES), the power train algorithm 40 may be inactive, and the transmission state (TS) and engine speed (ES) may be determined and set in a conventional manner. However, because the vehicle 10 is often operating at a relatively moderate speed, the power train algorithm 40 will often be operable to restrict the engine speed (ES) to the limited engine speed range ($ES_2$).

Referring to FIG. 3, when activated, the power train algorithm 40 will be operable to restrict the engine speed (ES) to the limited engine speed range ($ES_2$). While restricting the engine speed (ES) to the limited engine speed range ($ES_2$), the power train algorithm 40 will determine a combination of engine speed (ES) and transmission state (TS) that corresponds to the selected vehicle speed 21a and the predetermined criterion 41, illustrated as fuel economy. Typically, the power train algorithm 40 determines the engine speed (ES) and transmission state (TS) by using the map of engine speed (ES), within the limited engine speed range ($ES_2$), and transmission state (TS) versus vehicle speed 21a and load 18a. The transmission state (TS) and engine speed (ES) are mapped such that the power train algorithm 40 can determined the combination of transmission state (TS) and engine speed (ES) that a knowledgeable operator would select when operating the vehicle 10 at the selected vehicle speed 21a and load 18a. Thus, when the electronic control module 14 determines the selected vehicle speed 21a and the load 18a, the power train algorithm 40 can determine the corresponding engine speed (ES), within the limited engine speed range ($ES_2$), and the transmission state (TS) that will result in the selected vehicle speed 21a while limiting fuel consumption (FC). Although the power-train algorithm 40 will always determine an engine speed (ES) within the limited engine speed range ($ES_2$), the engine speed (ES) will be closer to the "optimal" engine speed that conserves fuel when the vehicle speed 21a and load 18a are moderate. The power train algorithm 40 preferably will then set the engine speed (ES) and transmission state (TS) based on the selected vehicle speed 21a and the predetermined criterion 41 of fuel economy. From the engine re-map 14b, the power train algorithm 40 can determine the quantity and timing of the fuel injection that will produce the determined engine speed (ES) while conserving fuel. The electronic control module 12 will communicate to the transmission 15 the determined transmission state (TS) via the transmission communication line 26, and will communicate to the engine 14 the determined control signals via the engine communication line 25. Although the present invention is illustrated as including the electronic control module 12 to determine, set and communicate the transmission state (TS) and the engine speed (ES) to the transmission 15 and the engine 14, respectively, it should be appreciated that there could be a transmission control module and an engine control module. At least one of the transmission control module and the engine control module could determine the combination of transmission state (TS) and engine speed (ES) and communicate it to the other control module.

Referring again to FIG. 2, although fuel economy is enhanced by limiting the engine speed (ES) to the limited engine speed range ($ES_2$), fuel economy preferably can be further enhanced by re-mapping the engine 14 for the limited engine speed range ($ES_2$) rather than for the entire engine speed range ($ES_1$). Those skilled in the art will appreciate that engines are mapped based on the application of the engine 14 and predetermined criteria 41. Depending on the type of vehicle 10 which the engine 14 will power, the engine 14 will have different applications. In the illustrated example of the over the road truck 10, the engine 10 will be expected to power the truck 10 when carrying a certain range of loads and when traveling within a certain range of vehicle speeds. The entire engine speed range ($ES_2$) is the range of engine speeds required to power the truck 10 carrying any expected load or traveling at any expected speed. It should be appreciated that that the vehicle could have more than one duty cycle, such as a bulldozer having a digging mode and a translational movement mode, and include an engine map based on each duty cycle. Further, an over the road truck 10, such as the one illustrated, may include an engine map based on the truck's highway operation and another engine map based on the truck's in city operation. Although those skilled in the art will appreciate that the engine 14, more than likely, would be mapped to achieve a variety of predetermined criteria 41, such as fuel economy, undesirable emissions reductions, and vehicular performance, the present invention illustrates the engine 14 being mapped for fuel economy.

Referring still to FIG. 2, the engine 14 is preferably re-mapped for the limited engine speed range ($ES_2$), and the engine re-map 14b is preferably included within the power train algorithm 40. When the engine 14 is mapped to improve the predetermined criteria 41 over the limited engine range ($ES_2$), less compromises must be made in order to meet the predetermined criteria 41 because the limited engine speed range ($ES_2$) does not include the upper portion 32 and the lower portion 30 of the entire engine speed range ($ES_1$). For instance, when the engine 14 includes the engine re-map 14b, fuel consumption (FC) is reduced for the engine 14 operating within the limited engine speed range ($ES_2$). Thus, the predetermined criterion 41 of fuel economy is improved. Although the fuel consumption (FC) is increased outside the limited engine speed range ($ES_2$) when the engine 14 includes the engine re-map 14b, the overall fuel consumption (FC) is reduced because the power train algorithm 40 limits the engine speed (ES) to the limited engine speed range ($ES_2$) the majority of its operating time. When there is a need to operate outside the limited engine speed range ($ES_2$), the electronic control module 12 would preferably de-activate the power train algorithm 40 and operate according to the conventional map 14a in a conventional manner. It should be appreciated that although the predetermined criteria 41 can be further enhanced by re-mapping the engine 14 within the limited engine speed range ($ES_2$), the present embodiment of the invention contemplates limiting the engine speed (ES) to the limited engine speed range ($ES_2$) without including the engine re-map 14b.

Overall, embodiments of the invention may permit all operators, despite their knowledge level, to operate the vehicle 10 while improving fuel economy. Although there are many combinations of engine speed (ES) and transmission state (TS) that will result in a selected vehicle speed 21a and load 18a, there is a desired combination of engine speed (ES) and transmission state (TS) that allows the engine 14 to power the vehicle 10 while consuming the least amount of fuel. Because the electronic control module 12, rather than the operator, determines the combination of engine speed (ES) and transmission state (TS) corresponding to the selected vehicle speed 21a and load 18a, the vehicle 10 will operate while improving fuel economy regardless of the knowledge of the operator. Thus, maintaining a pool of operators, who are knowledgeable as to the optimal combinations of engine speed (ES) and transmission state (TS), will not be as essential. This will reduce operator training costs and vehicle operation costs.

In addition, embodiments of the invention may further enhance fuel economy by maximizing the benefit provided when operating the engine 14 within the limited engine speed range ($ES_2$). First, the re-mapping of the engine 14 for the limited engine speed range ($ES_2$) increases the benefit provided by operating the engine 14 within the limited engine speed range ($ES_2$). Operating the engine 14 within the limited engine speed range ($ES_2$) based on the engine re-map 14b will result in greater achievement of the predetermined criteria 41 than operating the engine 14 at its ideal engine speed based on the conventional engine map 14a. In addition, embodiments of the invention may limit the engine speed (ES) to the improved limited engine speed range, being the limited engine speed range ($ES_2$). Although the predetermined criteria 41 is not as greatly achieved when the engine 14 is operating outside of the limited engine speed range ($ES_2$), the power train algorithm 41 restricts the engine speed (ES) to the limited engine speed range ($ES_2$). It should be appreciated that there are situations, such as when the vehicle is operating at low vehicle speeds and loads or operating at high vehicles speeds and loads, that the power train algorithm 40 will be inactive, and the engine speed (ES) will not be restricted to the limited engine speed range ($ES_2$). However, these situations are less frequent than the situations, such as when the vehicle is operating at moderate speeds and loads, that the power train algorithm 40 will be operable to restrict the engine speed (ES) to the limited engine speed range ($ES_2$). Thus, the power train algorithm 40 overall enhances the predetermined criteria 41 because the engine 14 most frequently operates at an engine speed (ES) within the improved limited engine speed range ($ES_2$). However, it should also be appreciated that limiting the engine speed (ES) to the limited engine speed range ($ES_2$), even without re-mapping the engine 14, may also better achieve the predetermined criteria 41 than operating the engine 14 over the entire engine speed range ($ES_1$).

Some embodiments of the invention may improve many aspects of vehicular operation. Although the present invention is illustrated as improving fuel economy, the engine can be mapped for a variety of predetermined criteria 41, including but not limited to, vehicular performance and undesirable emissions reduction. Moreover, some embodiment of the invention may permit auxiliary components 17, such as cooling systems and hydraulic systems, to be sized for the limited engine speed range ($ES_2$). Thus, because the engine 14 is limited to the limited engine speed range ($ES_2$), the auxiliary component 17 can be re-sized to operate within the limited engine speed range ($ES_2$) rather than the entire engine speed range ($ES_1$). This can potentially reduce auxiliary component cost without sacrificing reliability. The limited engine speed range ($ES_1$) will generally be able to power the auxiliary component 17 and the vehicle 10 at almost any speed 21a and load 18a. In the instances when the power-train algorithm 40 determines that the required engine speed (ES) is well within the limited engine speed range ($ES_2$), such as during part-load conditions, the auxiliary component 17 will be operating at near maximum efficiency. Lastly, as electronically controlled transmissions and engines are becoming more common, the need to better coordinate operation of the engine 14 and transmission 15 to better enhance the vehicular operation will increase.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of operating a vehicle, comprising:
   establishing a limited engine speed range that is less than an entire speed range of an engine, and said limited speed range excluding both a lowest and a highest portion of the entire speed range;

selecting a vehicle speed;

determining, at least in part, via a power train algorithm within an electronic control module, a combination of an engine speed and a transmission state that corresponds to the selected vehicle speed and a predetermined criteria; and the engine speed being within the limited engine speed range.

2. The method of claim 1 wherein the limited engine speed range is a middle portion of the entire engine speed range.

3. The method of claim 1 further comprising sizing an engine auxiliary component based, at least in part, on the limited engine speed range.

4. The method of claim 1 wherein the predetermined criteria includes at least one of vehicular performance, fuel economy and emissions reduction.

5. The method of claim 1 wherein determining comprises mapping engine speed and transmission state versus, at least, the vehicle speed and load.

6. The method of claim 5 wherein the predetermined criteria includes at least one of fuel economy, vehicular performance, and emissions reductions.

7. The method of claim 6 further comprising of sizing an engine auxiliary system based, at least in part, on the limited engine speed range being a middle portion of the entire engine speed range.

8. The method of claim 7 further comprising setting, at least in part, via the power train algorithm, the engine speed and transmission state based, at least in part, on the selected vehicle speed and a predetermined criteria.

9. A control system comprising:

a computer readable data storage medium;

a power train algorithm being recorded on the medium; and the power train algorithm being operable to restrict an engine speed to a limited engine speed range which is less than an entire engine speed range, and said limited speed range excluding both a lowest and a highest portion of said entire speed range; and the power train algorithm being operable to determine an engine speed and a transmission state based, at least in part, on a selected vehicle speed and a predetermined criteria.

10. The control system of claim 9 wherein the power train algorithm comprises a map of the engine speed and transmission state versus, at least, vehicle speed and load.

11. The control system of claim 9 wherein the limited engine speed range comprises a middle portion of the entire engine speed range.

12. The control system of claim 9 wherein the predetermined criteria comprises at least one of fuel economy, vehicular performance, and emission reduction.

13. The control system of claim 10 wherein the limited engine speed range comprises a middle portion of the entire engine speed range; and the predetermined criteria includes at least one of fuel economy, vehicular performance, and emission reduction.

14. A vehicle comprising:

a chassis;

an engine mounted to the chassis;

a transmission mounted to the chassis and operably coupled to the engine;

a vehicle speed setting operator interface supported by the chassis;

an electronic control module operably coupled to the operator interface and being in control communication with the engine and the transmission, and including a power train algorithm;

the power train algorithm being operable to restrict the engine speed to a limited engine speed range which is less than an entire engine speed range, and said limited speed range excluding both a lowest and a highest portion of said entire speed range; and the power train algorithm being operable to determine an engine speed and a transmission state corresponding to a selected vehicle speed and a predetermined criteria.

15. The vehicle of claim 13 wherein the limited engine speed range comprises a middle portion of the entire speed range.

16. The vehicle of claim 13 wherein the power-train algorithm comprises a map of engine speed and transmission state versus, at least, vehicle speed and load.

17. The vehicle of claim 13 wherein the predetermined criteria comprises at least one of fuel economy, vehicle performance, and emissions reduction.

18. The vehicle of claim 13 including at least one auxiliary component being sized based, at least in part, on the limited engine speed range being a middle portion of the entire engine speed range.

19. The vehicle of claim 18 wherein the power-train algorithm comprises a map of engine speed and transmission state versus, at least, vehicle speed and load.

20. The vehicle of claim 19 wherein the predetermined criteria comprises at least one of fuel economy, vehicle performance, and emissions reduction.

* * * * *